United States Patent [19]
Messih et al.

[11] Patent Number: 5,546,909
[45] Date of Patent: Aug. 20, 1996

[54] METHOD AND SYSTEM FOR GENERATING A FUEL PULSE WAVEFORM

[75] Inventors: Isis A. Messih, Troy; Paul C. Mingo, Farmington Hills, both of Mich.

[73] Assignee: Ford Motor Company, Dearborn, Mich.

[21] Appl. No.: 364,329

[22] Filed: Dec. 27, 1994

[51] Int. Cl.$^6$ .............................. F02D 41/10; F02D 41/12
[52] U.S. Cl. ............................................ 123/492; 123/493
[58] Field of Search .................................. 123/478, 480, 123/492, 493

[56] References Cited

U.S. PATENT DOCUMENTS

| | | | |
|---|---|---|---|
| 4,785,784 | 11/1988 | Nanyoshi et al. | 123/480 X |
| 4,911,131 | 3/1990 | Nakaniwa et al. | 123/492 |
| 5,003,953 | 4/1991 | Welgarz et al. | 123/492 X |
| 5,353,768 | 10/1994 | Messih et al. | 123/491 |

FOREIGN PATENT DOCUMENTS

WO94/01668  1/1994  WIPO ................................ 123/492

*Primary Examiner*—Tony M. Argenbright
*Attorney, Agent, or Firm*—Peter Abolins; Roger L. May

[57] ABSTRACT

A method and system for generating electronic fuel injection pulse waveforms to achieve an accurate air/fuel ratio control during transient conditions. Sensors are provided for sensing a plurality of engine parameters. An electronic engine controller is provided for performing a plurality of steps associated with the method. The method includes storing calibration data and sensing the engine parameters. A leading edge of the fuel pulse waveform is calculated based on the stored calibration data and the sensed engine parameters. The leading edge of the fuel pulse waveform is generated, thereby triggering an interrupt. Next, a trailing edge of the fuel pulse waveform is calculated based on current fuel mass requirements determined during the duration of the fuel pulse. The method concludes with the step of generating the trailing edge of the fuel pulse waveform.

20 Claims, 4 Drawing Sheets

METHOD AND SYSTEM FOR GENERATING A FUEL PULSE WAVEFORM

TECHNICAL FIELD

This invention relates to electronic fuel injection control. In particular, this invention relates to a method and system for generating a fuel pulse waveform to control fuel delivery by a fuel injector into a cylinder in order to achieve an accurate air/fuel ratio control during transient engine operation.

BACKGROUND ART

Electronic controllers are often utilized to control various aspects of physical systems. Such controllers receive information from the physical system, process the information and generate one or more control signals to control certain aspects of the operation of the physical system. Although such controllers allow a great deal of information to be processed in a brief period of time, certain physical systems, by virtue of their complexity and speed of operation, impose significant demands on such controllers to generate accurate control signals in response to rapidly changing conditions.

For example, a controller is utilized to schedule a fuel injector pulse to meet the engine fuel requirements. In such a system, the fuel pulse profile, including a leading edge and a trailing edge, is determined at the same time that the fuel pulse leading edge is scheduled. The fuel pulse leading edge is scheduled ½ to 1-½ Profile Ignition Pickups (PIPs) before the intended starting time of the fuel pulse. Consequently, the fuel pulse profile information used to schedule injector pulses lags the calculated value by at least one PIP under most circumstances.

Accordingly, there exists a need for an electronic controller which can accurately schedule a fuel injector pulse utilizing the most recent injector pulse profile calculations to adjust the trailing edge of the injector pulse after it starts so as to optimize fuel control.

DISCLOSURE OF THE INVENTION

It is a general object of the present invention to improve engine performance, and particularly during transient operating conditions, by controlling the amount of fuel delivered to the engine in a manner that is consistent with the current operating conditions of the engine.

It is another object of the present invention to determine the fuel pulse profile of the fuel injector while the fuel pulse is in progress.

It is yet another object of the present invention to provide a quick and efficient method of determining the fuel pulse profile in a manner that is consistent with the current operating conditions of the engine.

In carrying out the above objects and other objects, features and advantages, of the present invention, a method is provided for generating a fuel pulse waveform.

The method includes the initial steps of storing a plurality of calibration data and sensing a plurality of engine parameters. The engine parameters are continuously sensed throughout the operation of the engine.

In response to a first predetermined event, the method continues with the step of calculating an initial engine fuel requirement based on the stored calibration data and the sensed engine parameters. An initial fuel mass is calculated that is required by a cylinder.

Upon calculating the initial engine fuel requirement, a leading edge of the fuel pulse waveform is calculated. The required fuel mass is converted into an initial fuel pulse width.

Next, the method continues with the step of generating the leading edge of the fuel pulse waveform based on the calculated leading edge thereby initiating the delivery of fuel into the cylinder.

In response to a second predetermined event, the method continues with the step of calculating at least one final engine fuel requirement in response to each first predetermined event detected based on the stored calibration data and the sensed engine parameters. The second predetermined event is the generation of the leading edge of the fuel pulse waveform. The final engine fuel requirement is based on the latest fuel mass requirements available.

Upon calculating the final engine fuel requirement, at least one trailing edge of the fuel pulse waveform is calculated. The final required fuel mass is then converted into the final fuel pulse width.

Finally, a trailing edge of the fuel pulse waveform is generated so as to complete the delivery of fuel into the cylinder. The trailing edge of the fuel pulse is based on the most recently calculated fuel requirement.

In further carrying out the above objects and other objects, features and advantages, of the present invention, a system is also provided for carrying out the steps of the above described method.

The system includes a plurality of sensors for sensing a plurality of engine parameters.

The system further includes an electronic engine controller for storing calibration data. The electronic engine controller is also utilized for calculating a leading edge of the fuel pulse waveform based on the sensed engine parameters and the stored calibration data and for generating the leading edge of the fuel pulse waveform.

Furthermore, the electronic engine controller is utilized for calculating a trailing edge of the fuel pulse waveform based upon current calculations of fuel mass requirements determined during the duration of the fuel pulse waveform.

Finally, the electronic engine controller is also utilized for generating the trailing edge of the fuel pulse waveform so as to complete delivery of fuel into the combustion chamber of the internal combustion engine.

The above objects, features and advantages of the present invention, as well as others, are readily apparent from the following detailed description of the best mode for carrying out the invention when taken in connection with the accompanying drawings.

BRIEF DESCRIPTION OF THE DRAWINGS

The present invention will be more clearly understood by reference to the following detailed description of a preferred embodiment when read in conjunction with the accompanying drawings in which like reference characters refer to like parts throughout the views and in which.

BEST MODES FOR CARRYING OUT THE INVENTION

Figure 1:
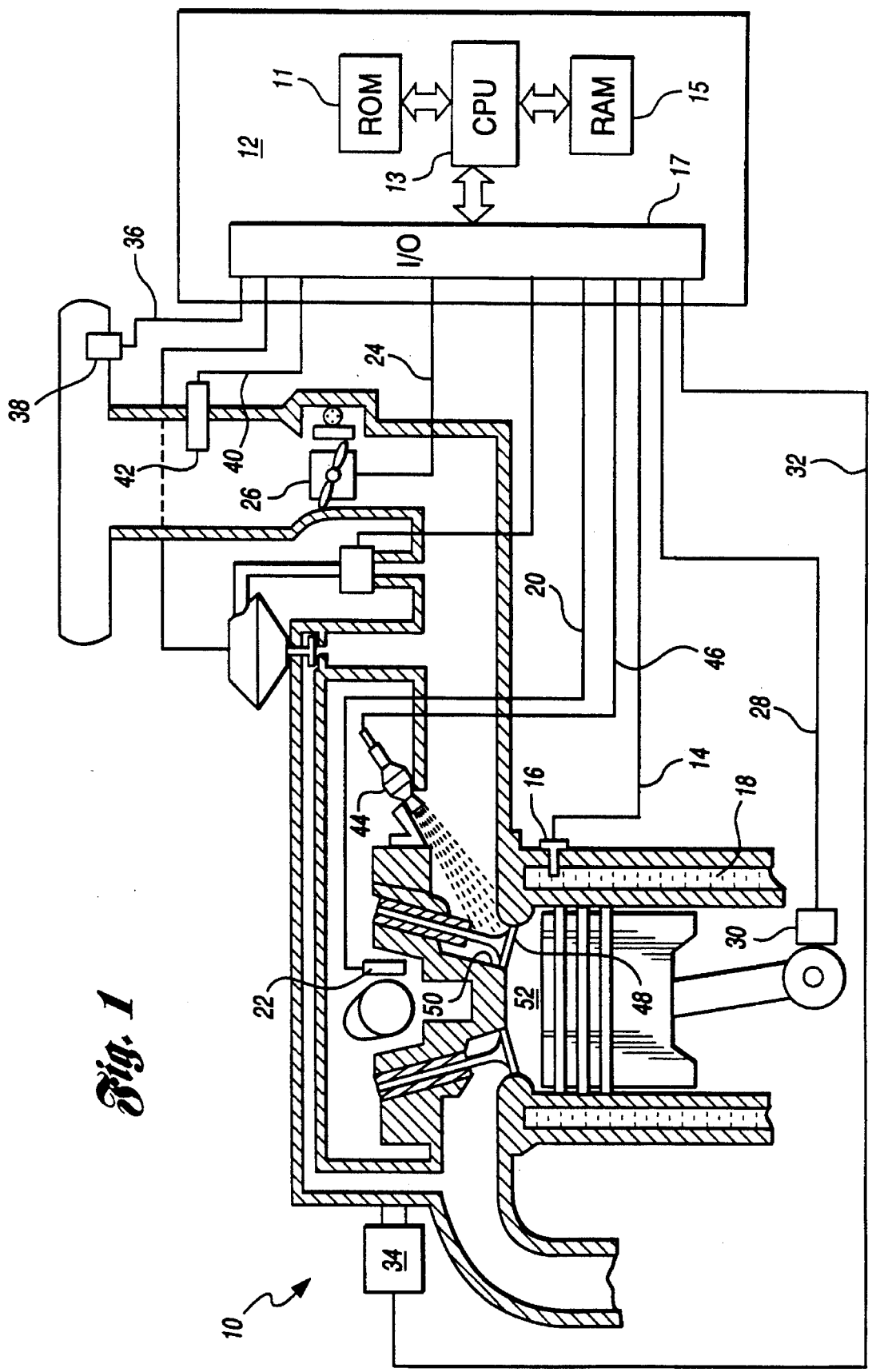
FIG. 1 is a schematic of an internal combustion engine and an electronic engine controller which embody the principles of the invention.

Turning now to FIG. 1, there is shown an internal combustion engine which incorporates the teachings of the present invention. The internal combustion engine 10 comprises a plurality of combustion chambers, or cylinders, one of which is shown in FIG. 1. The engine 10 is controlled by an Electronic Engine Controller (EEC) 12 having a Read Only Memory (ROM) 11, a Central Processing Unit (CPU) 13, and a Random Access Memory (RAM) 15. The EEC 12 receives a plurality of signals from the engine 10 via an Input/Output (I/O) port 17, including an Engine Coolant Temperature (ECT) signal 14 from an engine coolant temperature sensor 16 which is exposed to engine coolant circulating through coolant sleeve 18, a Cylinder Identification (CID) signal 20 from a CID sensor 22, a throttle position signal 24 generated by a throttle position sensor 26, a Profile Ignition Pickup (PIP) signal 28 generated by a PIP sensor 30, a Heated Exhaust Gas Oxygen (HEGO) signal 32 from a HEGO sensor 34, an air intake temperature signal 36 from an air temperature sensor 38, and an air flow signal 40 from an air flow meter 42. The EEC 12 processes these signals received from the engine and generates a fuel injector pulse waveform transmitted to the fuel injector 44 on signal line 46 to control the amount of fuel delivered by the fuel injector 44. Intake valve 48 operates to open and close intake port 50 to control the entry of an air/fuel mixture into combustion chamber 52.

Figure 2:
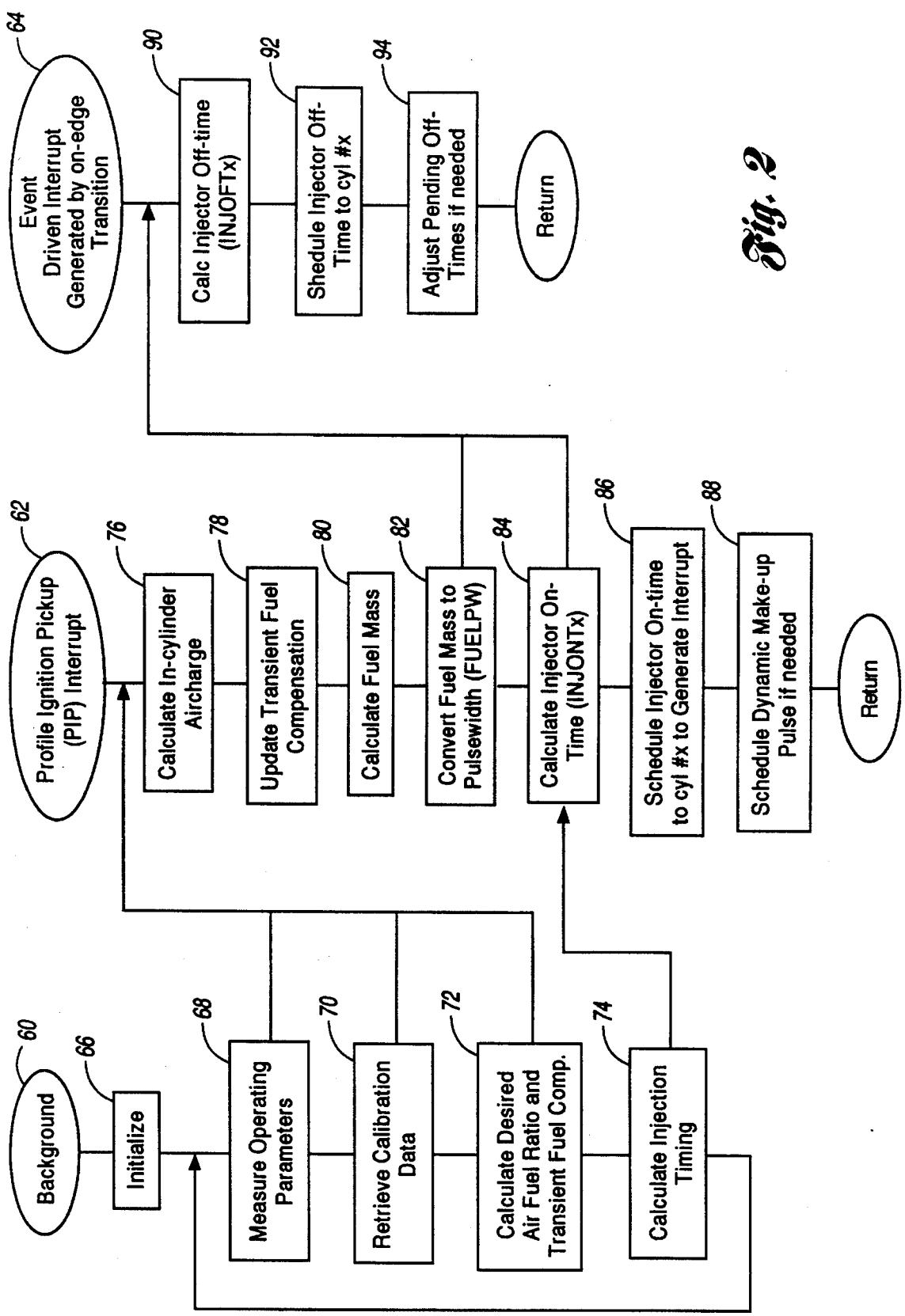
FIG. 2 is a flow chart illustrating the general sequence of steps associated with the operation of the present invention.

FIG. 2 illustrates a fuel pulse waveform generation routine comprising a series of steps performed by the preferred embodiment of the present invention. The fuel pulse waveform generation routine consists of three major blocks, a Background Loop 60, a PIP Interrupt 62, and an Event Driven Interrupt 64.

The Background Loop 60 is executed continuously by the EEC 12. At step 66 the method is initialized. Next, at step 68, engine operating parameters are measured, such as, but not limited to, air flow, engine coolant temperature, air intake temperature, and throttle position.

The method continues with step 70 to retrieve calibration data. The calibration data represents a set of predetermined values in response to measured engine operating parameters.

Next, at step 72, the desired Air to Fuel Ratio and Transient Fuel Compensation are calculated according to any one of a variety of known methods. The desired Air to Fuel Ratio is indicative of the desired mixture of air and gasoline required by the engine, and the desired Transient Fuel Compensation is indicative of the fuel mass needed to compensate for wall wetting effects.

As indicated at step 74, a desired end of fuel injection timing, which is indicative of optimum injection timing is obtained from a table of predetermined values contained in the ROM 11 of the EEC 12. The angle of the trailing edge of the fuel pulse is determined from the stored calibration data, but no conversion to the time domain is performed at this time.

The PIP Interrupt 62 represents a routine that is executed upon sensing an engine firing event. When the PIP Interrupt 62 is initiated, the method continues to calculate the leading edge of the fuel pulse profile based on the stored calibration data and the sensed engine parameters.

At step 76 an in-cylinder air charge ($CYL\_AIR\_CHG$), which is indicative of engine load, is calculated by the EEC 12 as a function of mass air flow into the induction system as measured by the air flow meter 42 and engine angular speed as indicated by the PIP signal 28.

At step 78 the transient fuel compensation ($TFC\_FUEL$) is updated to determine the corrected amount of fuel necessary to compensate for wall wetting effects based on the most recent in-cylinder air charge value.

At step 80 the desired amount of fuel mass is calculated according to the following relationship:

$$\text{Fuel Mass} = (CYL\_AIR\_CHG / AIR\_FUEL\_RATIO) + TFC\_FUEL$$

The desired amount of fuel is then converted to the desired fuel injector pulse width at step 82 according to the following relationship:

$$FUELPW = (\text{Fuel Mass/Injector Slope}) + \text{Injector Offset}$$

where:

Injector Slope=Injector Flow Rate (lb/msec)

Injector Offset=Pulse width offset (msec/pulse)

FUELPW=Injector pulse width (msec)

At step 84 the fuel pulse leading edge, or ON time (INJONTx), is calculated for a particular cylinder, x, so as to deliver the desired pulse width at the optimum injection timing. Based upon the injection timing calculated at step 74, the leading edge, or ON time, is determined by converting the desired engine fuel requirement, or FUELPW, to an angular domain and subtracting this angle from the desired OFF edge. The angular ON edge is then converted to the time domain by extrapolating from the time of the last low to high PIP transition at a known angle.

The actuator of the corresponding fuel injector is then scheduled to turn ON at the calculated fuel pulse leading edge. The fuel injector OFF time is not scheduled yet. The method insures that the injector leading edges are scheduled ½ to 1-½ PIP periods in the future, even under transient conditions.

The method proceeds to schedule an event driven interrupt to occur when the fuel injector transitions to the ON state, as shown by step 86.

Also, at step 88, a dynamic make-up pulse is scheduled if needed. The dynamic make-up pulse serves to make up the increase in fuel flow requirements generally occurring during a tip-in, or acceleration, mode.

The Event Driven Interrupt 64 is executed in response to the interrupt generated by the leading edge of the fuel pulse. At step 90 a fuel pulse trailing edge, or OFF time (INJOFTx), is calculated using the most recently calculated FUELPW for optimum air to fuel ratio control during changing fuel flow requirements. The FUELPW is calculated each time a high or low PIP edge transition is detected. The FUELPW used to calculate the trailing edge of the fuel pulse is likely not the same one which was converted to the angular domain to determine the leading edge of fuel pulse. More than one FUELPW may be calculated while the fuel pulse is in progress.

At step 92 the injector OFF time is scheduled for cylinder x based on the calculated fuel pulse trailing edge.

The latest FUELPW calculation is utilized to calculate the trailing edge of the fuel pulse. Therefore, the OFF time of the fuel pulse may be adjusted as shown by step 94. Alternatively, the trailing edge of the fuel pulse may not be adjusted unless the current FUELPW calculation differs from the previous calculated FUELPW by a predetermined amount, e.g., 2–3 percent.

Figure 3:
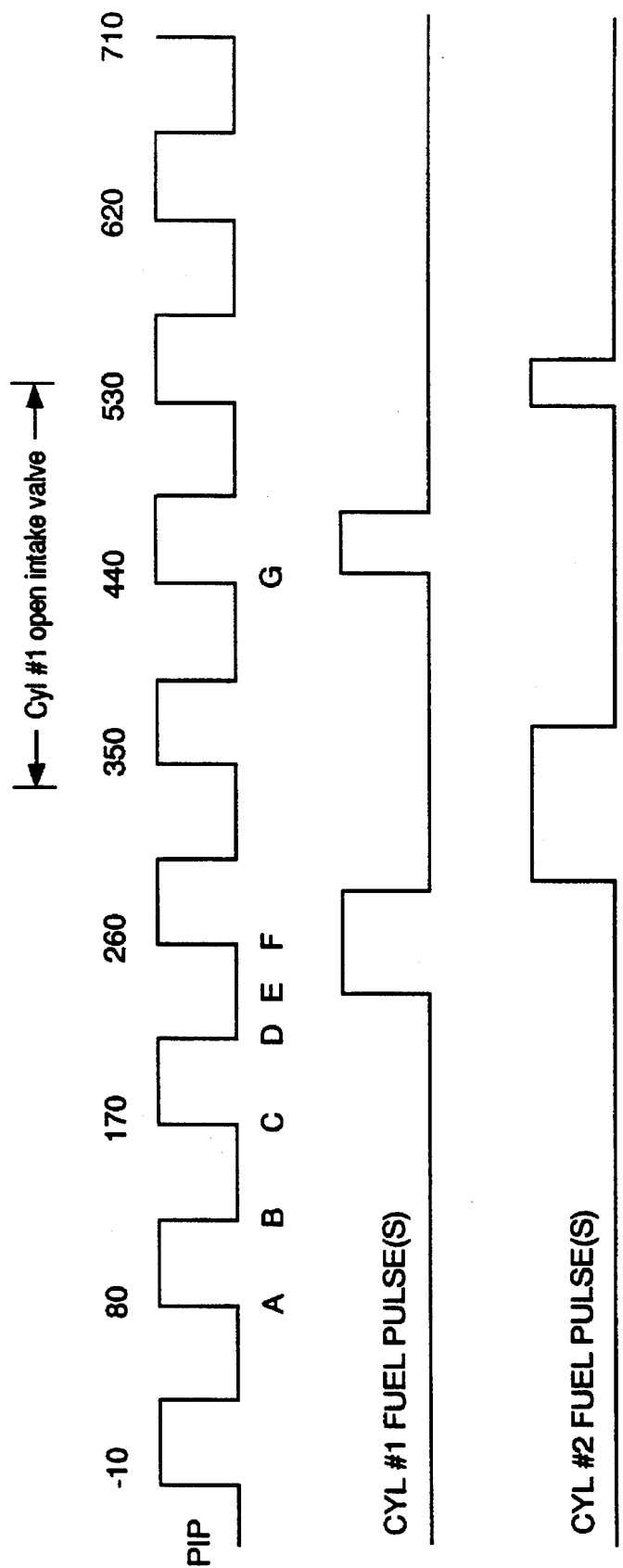
FIG. 3 is a schematic diagram illustrating the generation of a fuel pulse waveform in accordance with the teachings of the preferred embodiment during a tip-in state.
Figure 4:
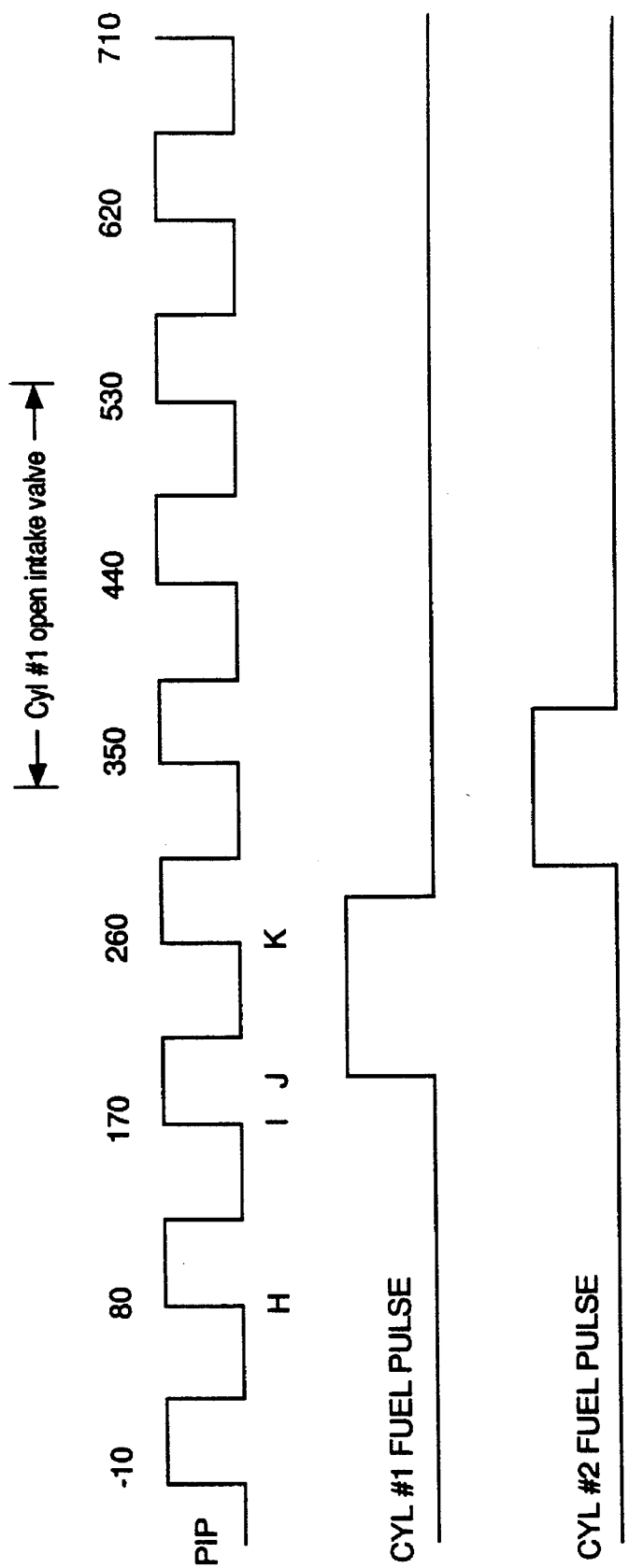
FIG. 4 is a schematic diagram illustrating the generation of a fuel pulse waveform in accordance with the teachings of the preferred embodiment during a tip-out state.

FIGS. 3 and 4 illustrate the injection pulse scheduling for an 8 cylinder engine with 90 crank angle degrees between PIP leading edges. The required end of injection timing is assumed to be 280 degrees After Top Dead Center (ATDC).

FIG. 3 illustrates the generation of fuel pulses during a tip-in, or an increasing fuel flow requirement, situation. At point C, a PIP up edge transition, the PIP Interrupt 62 routine of the present invention is executed. The cylinder air charge ($CYL_{13}AIR_{13}CHG$) calculation, step 76, is performed based on the air flow measurements taken by air flow meter 17 at time A, B and C.

The method continues with steps 78–82. At steps 84 and 86, the injector ON time is calculated and scheduled to occur at time E along with the event driven interrupt. At time E, the interrupt is generated when the fuel injector is actuated. At this time, the FUELPW calculations at time C are still used. In some case, new FUELPW calculations may have become available and could be reflected in the calculations of the injector OFF time.

At time F, another PIP up edge transition occurs and the PIP Interrupt 62 routine is initiated. A new $CYL_{13}AIR_{13}CHG$ calculation becomes available based on the air flow measurements taken at time C, D and F. Steps 76–86 are repeated for the next cylinder in the firing sequence (cyl#2) and a new FUELPW is calculated.

If the fuel pulse width calculated at time F is greater than the fuel pulse width calculated at time C by a predetermined threshold, typically 2–3%, the OFF time for the cylinder #1 injector is recalculated, step 94, and the pulse is extended. Similarly, any other injectors which have a pulse-in-progress at that time will be extended to reflect the new fuel requirements.

At time G, which occurs approximately in the middle of the intake stroke for cylinder #1, another PIP up edge transition occurs and another FUELPW calculation becomes available. If the required FUELPW calculated at time G exceeds the FUELPW calculated at time F by the predetermined threshold, a second fuel injection to cylinder #1 occurs in the open intake valve. This dynamic pulse serves to make-up the increase in the fuel flow requirements from time F to time G and prevents a lean air to fuel ratio excursion from occurring. This generally occurs during an acceleration mode.

Turning now to FIG. 4, the fuel pulse waveform generated during a tip-out, or deceleration, state is shown. At time H, the PIP Interrupt 62 routine is executed. The method calculates the ON time of the fuel injector and schedules the actuation of the cylinder. The event driven interrupt is also scheduled to occur as the injector transitions to the ON state at the injector ON time, time J.

At time I, a new FUELPW is calculated and scheduled to the next cylinder in the firing sequence, cylinder #2. At time J, the interrupt is generated by the leading edge of the fuel pulse of cylinder #1. The FUELPW calculations at time I are used and are reflected in the calculations of the injector OFF time for cylinder #1.

At time K, yet another FUELPW calculation becomes available. If the FUELPW calculation at time K has decreased by the predetermined threshold, the trailing edge of the fuel pulse for cylinder #1 is rescheduled and the pulse is truncated to reflect the new fueling requirements. Similarly, any other injectors which have a pulse-in-progress at that time will be truncated to reflect the new fuel requirements so as to avoid an over rich air-to-fuel ratio condition on a tip-out.

While the best modes for carrying out the invention have been described in detail, those familiar with the art to which this invention relates will recognize various alternative designs and embodiments for practicing the invention as defined by the following claims.

What is claimed is:

1. A method of generating a fuel pulse waveform, including a leading edge and a trailing edge, to control fuel delivery from a fuel injector to a cylinder of an internal combustion engine, the method comprising:

storing a plurality of calibration data;

sensing a plurality of engine parameters;

in response to a first event of a plurality of predetermined events prior to activation of the fuel injector, calculating an initial engine fuel requirement based on the stored calibration data and the sensed engine parameters; and calculating a leading edge of the fuel pulse waveform based on the calculated initial engine fuel requirement;

generating the leading edge of the fuel pulse waveform based on the calculated leading edge;

in response to the generation of the leading edge, calculating at least one final engine fuel requirement in response to each event of the plurality of predetermined events based on the stored calibration data and the sensed engine parameters; and calculating a trailing edge of the fuel pulse waveform based on each of the calculated final engine fuel requirements; and generating the trailing edge of the fuel pulse waveform based on the calculated trailing edge.

2. The method of claim 1 wherein the plurality of predetermined events are generated by a plurality of interrupts.

3. The method of claim 2 wherein each of the plurality of interrupts is a profile ignition pickup edge transition.

4. The method of claim 1 further comprising the step of scheduling a second interrupt in response to the step of calculating the initial engine fuel requirement.

5. The method of claim 4 wherein the second interrupt is a software generated interrupt.

6. The method of claim 5 wherein the software generated interrupt is initiated in response to the step of generating the leading edge of the fuel pulse waveform.

7. The method of claim 1 wherein the stored calibration data represent predetermined values in response to measured engine operating parameters.

8. The method of claim 1 wherein the step of sensing a plurality of predetermined engine parameters includes the step of sensing air flow, engine coolant temperature, air intake temperature and throttle position.

9. The method of claim 1 wherein the step of calculating an initial engine fuel requirement includes the step of determining an initial mass of fuel that is required to be delivered to the cylinder.

10. The method of claim 9 wherein the step of calculating a leading edge of the fuel pulse waveform includes the step of converting the initial required mass of fuel into an initial desired fuel pulse width.

11. The method of claim 1 wherein the step of calculating at least one final engine fuel requirement includes the step of determining a final mass of fuel that is required to be delivered to the cylinder.

12. The method of claim 11 wherein the step of calculating the trailing edge of the fuel pulse waveform includes the step of converting the final required mass of fuel into a final desired fuel pulse width.

13. The method of claim 1 wherein the step of generating the trailing edge of the fuel pulse waveform includes the step of generating the trailing edge based on the calculated trailing edge determined using the most recent final fuel requirement.

14. The method of claim 13 wherein the most recent final fuel requirement is used to calculate the trailing edge only if the most recent final fuel requirement differs from the previous final fuel requirement by a predetermined amount.

15. A method of generating a fuel pulse waveform to control fuel delivery to a cylinder of an internal combustion engine, the method comprising:

storing a plurality of calibration data;

sensing a plurality of engine parameters;

in response to a first event of a plurality of predetermined events prior to activation of the fuel injector, calculating an initial engine fuel requirement based on the stored calibration data and the sensed engine parameters;

calculating a leading edge of the fuel pulse waveform based on the calculated initial engine fuel requirement; and scheduling an interrupt prior to the termination of the initial engine fuel requirement based on the calculated leading edge; and generating the leading edge of the fuel pulse waveform based on the calculated leading edge;

in response to the interrupt, calculating at least one final engine fuel requirement in response to each event of the plurality of predetermined events based on the stored calibration data and the sensed engine parameters; and calculating a trailing edge of the fuel pulse waveform based on each of the calculated final engine fuel requirements; and generating the trailing edge of the fuel pulse waveform based on the calculated trailing edge corresponding to the most recent final engine fuel requirement.

16. The method of claim 15 wherein each of the plurality of predetermined events is a profile ignition pickup edge transition.

17. The method of claim 15 wherein the most recent final fuel requirement is used to calculate the trailing edge only if the most recent final fuel requirement differs from the previous final fuel requirement by a predetermined amount.

18. A system for generating a fuel pulse waveform to control fuel delivery to a cylinder of an internal combustion engine, the system comprising:

a plurality of sensors for sensing a plurality of engine parameters; and an electronic engine controller for performing the following:

storing a plurality of calibration data;

in response to a first event of a plurality of predetermined events prior to activation of the fuel injector, calculating an initial engine fuel requirement based on the stored calibration data and the sensed engine parameters;

calculating a leading edge of the fuel pulse waveform based on the calculated initial engine fuel requirement; and generating the leading edge of the fuel pulse waveform based on the calculated leading edge;

in response to the generation of the leading edge, calculating at least one final engine fuel requirement in response to each event of the plurality of predetermined events based on the stored calibration data and the sensed engine parameters;

calculating a trailing edge of the fuel pulse waveform based on each of the calculated final engine fuel requirements; and generating the trailing edge of the fuel pulse waveform based on the calculated trailing edge.

19. A system as recited in claim 18 wherein each of the plurality of predetermined events is a profile ignition pickup edge transition.

20. A system as recited in claim 18 further comprising the step of scheduling a software-generated interrupt in response to the step of calculating the initial engine fuel requirement and wherein the software-generated interrupt is initiated upon generation of the leading edge of the fuel pulse waveform.

* * * * *